(12) United States Patent
Rettig et al.

(10) Patent No.: US 7,533,372 B2
(45) Date of Patent: May 12, 2009

(54) CROSS LANGUAGE MIGRATION

(75) Inventors: Bjorn C. Rettig, Redmond, WA (US);
Hwi-sung Im, Bellevue, WA (US);
Xiaofeng Zang, Redmond, WA (US);
Rerkboon Suwanasuk, Redmond, WA (US); Shenghua Ye, Sammamish, WA (US); Yong Guo, Issaquah, WA (US);
Michael Edward Lindell, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 949 days.

(21) Appl. No.: 10/633,578

(22) Filed: Aug. 5, 2003

(65) Prior Publication Data

US 2005/0033718 A1 Feb. 10, 2005

(51) Int. Cl.
*G06F 9/45* (2006.01)
(52) U.S. Cl. ................ 717/136; 717/137; 717/140; 717/168; 717/169
(58) Field of Classification Search ......... 717/109–147; 709/318; 705/9; 715/513
See application file for complete search history.

(56) References Cited

U.S. PATENT DOCUMENTS

| | | | | |
|---|---|---|---|---|
| 5,230,049 A | * | 7/1993 | Chang et al. | 717/143 |
| 5,659,753 A | * | 8/1997 | Murphy et al. | 717/147 |
| 6,035,121 A | * | 3/2000 | Chiu et al. | 717/141 |
| 6,990,654 B2 | * | 1/2006 | Carroll, Jr. | 717/109 |
| 2003/0126559 A1 | * | 7/2003 | Fuhrmann | 715/513 |
| 2003/0145124 A1 | * | 7/2003 | Guyan et al. | 709/318 |
| 2005/0149376 A1 | * | 7/2005 | Guyan et al. | 705/9 |
| 2007/0061789 A1 | * | 3/2007 | Kaneko et al. | 717/140 |

* cited by examiner

*Primary Examiner*—Lewis A Bullock, Jr.
*Assistant Examiner*—Michael Yaary
(74) *Attorney, Agent, or Firm*—Birch, Stewart, Kolasch & Birch, LLP (57) ABSTRACT

A process for migrating a system or application from a localized language to a localization independent language. The process comprises at least a process for determining which strings need to be set to a localization independent language and at least a second process for handling the conversion of the strings to the localization independent language.

38 Claims, 10 Drawing Sheets

CROSS LANGUAGE MIGRATION

BACKGROUND OF THE INVENTION

1. Field of the Invention

Aspects of the present invention relate to updating operating systems and programs. More particularly, aspects of the present invention relate to updating one or more computer programs and various settings and data in an operating system.

2. Description of Related Art

Computing systems exist in a number of languages. A number of software applications and operating systems are created in English then ported over to other languages. The localized versions of the operating systems and applications alter a number of items in these various applications and operating systems. For instance, registry settings, file names, folder names and other items may reflect the local language as opposed to the language in which the application or operating system was created.

Figure 9:
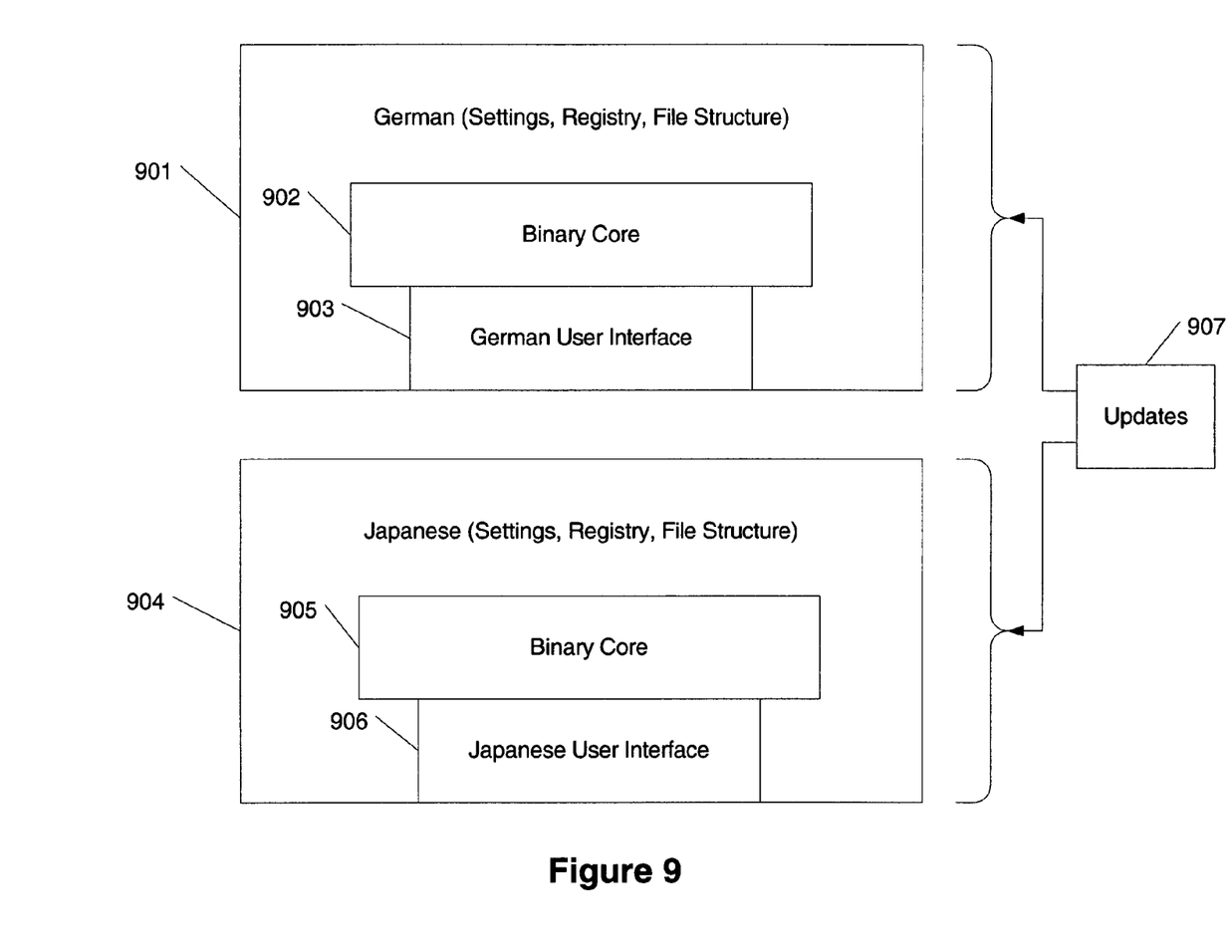
FIG. 9 shows conventional systems in localized languages receiving an update.

For freshly installed English versions of an operating system, all these strings would be English, thereby eliminating the need to migrate the operating system. However, non-English versions of applications and operating systems may be difficult to upgrade or migrate. For instance, FIG. 9 shows two systems (applications or operating systems) 901 and 904. System 901 is a German version and system 904 is the Japanese version. Each system includes a common binary core 902 and 905. However, each has its own respective user interface 903 and 906. Finally, the remainder of the each system 901 and 904 (including registry settings, file names, folder names, and the like) reflects the localized language (here, German and Japanese, respectively).

Servicing applications that have been released in various languages can become problematic. For instance, one would need to service an application or operating system in all languages in which the application or operating system was released to provide for consistent service among all languages. Updates 907 to the applications or operating systems 901 and 904 are problematic to install as each local version of an application or operating system would need its own respective update in its own localized language. If an application or operating system is produced in the top 100 languages of the world, than each update would need to be modified for each localized language. For products that constantly undergo updates, creating and releasing a separate upgrade for each language is extremely cumbersome and not cost efficient, as most companies would rather direct their efforts to upgrades than worry about each specific language for an update.

It would be beneficial to allow applications and operating systems to be migrated to a common language to use a common update. This may be referred to as cross language migration. However, the main issue with cross language migration is caused by the localized system folders and file paths. This information is manifest in the localized system folder names, how these names are treated in the registry, and how applications use them (and application data) in the localized system.

BRIEF SUMMARY

Aspects of the present invention address one or more of the issues mentioned above, thereby providing cross language migration of systems. Aspects of the present invention include a process for analyzing the structure of a system to be migrated from a first language to a second language and a process for implementing the migration. Another process performs the actual migration of the system. A third process may be used to correct any compatibility issues that may arise with the migration.

Some aspects of the present invention enable some aspects of an operating system or application to be language independent (or language neutral) while other aspects to be in a localized form. At least one benefit of these aspects is that the language neutral data (including registry settings, file names, folder names, and the like) are easier to service than language dependent code.

These and other aspects are addressed in relation to the Figures and related description.

BRIEF DESCRIPTION OF THE DRAWINGS

Various aspects of the present invention are illustrated in the attached figures.

DETAILED DESCRIPTION OF THE DRAWINGS

Aspects of the present invention relate to a system and process for migrating systems from a localized language to a primary or localization independent language. A migrated system is easier to update and maintain. For instance, once migrated, the system may more easily have new language localizations added to it. The following is separated into various sections to assist the reader. These headings include: general-purpose computing environment; overview of cross language migration; localized information generation; and localized system migration.

General-Purpose Computing Environment

Figure 1:
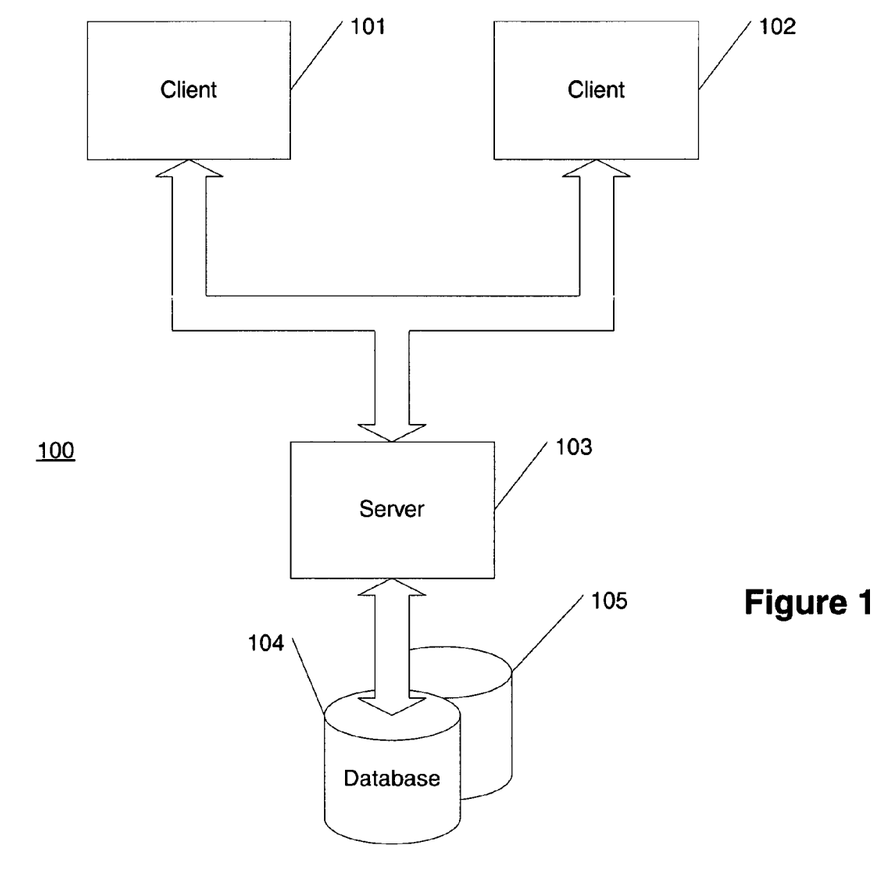
FIGS. 1 and 2 show general-purpose computing environments supporting one or more aspects of the present invention.
Figure 2:
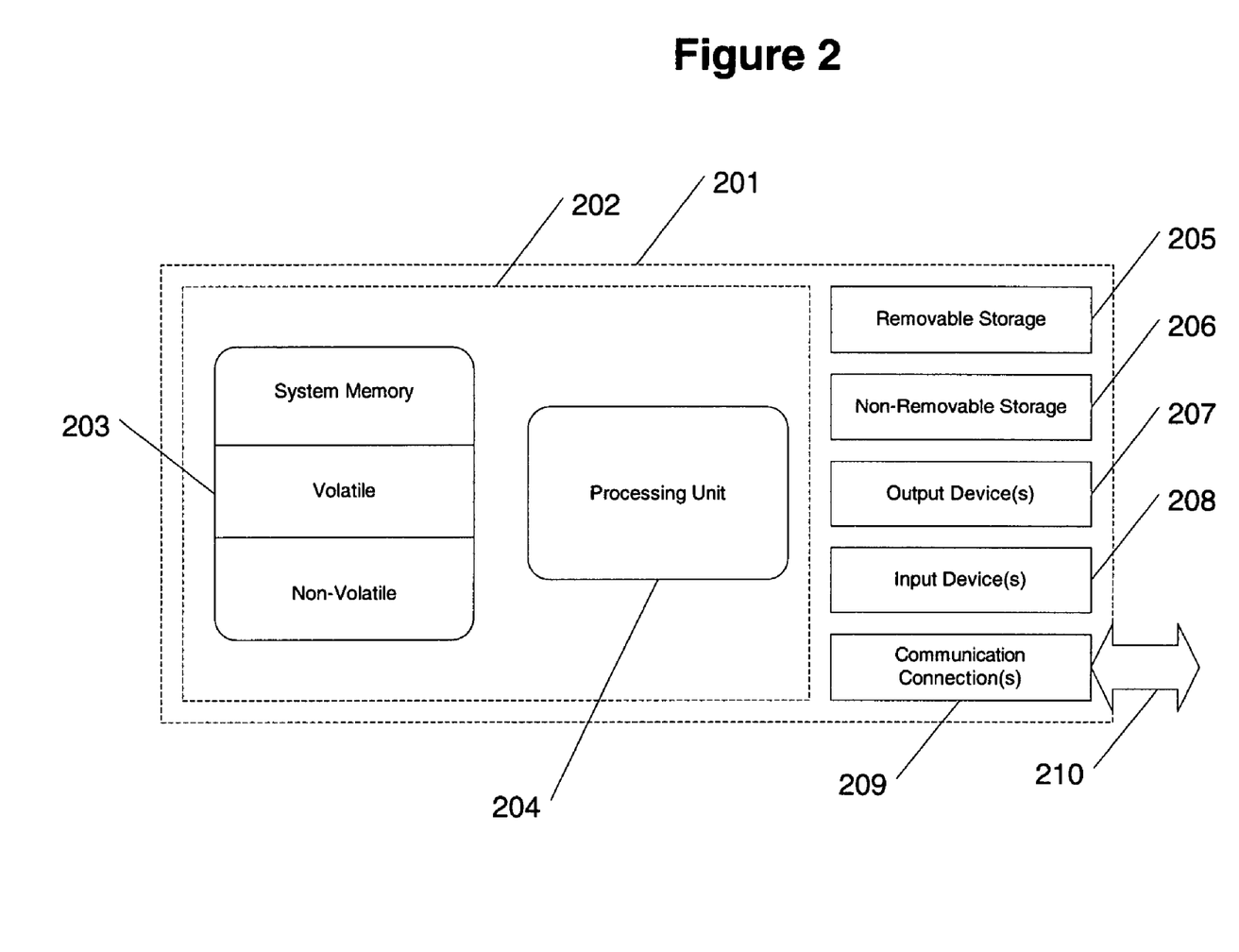

FIGS. 1 and 2 illustrate examples of suitable operating environments 100 and 201 in which the invention may be implemented. The operating environments 100 and 201 are only a few examples of suitable operating environments and are not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Aspects of the invention may be described in the general context of computer-executable instructions, such as program modules, executed by one or more computers or other devices. Generally, program modules include routines, algorithms, programs, objects, components, data structures, etc. that perform particular tasks or implement particular abstract data types. Typically, the functionality of the program modules may be combined or distributed as desired in various embodiments.

Computing device systems 100 and 201 typically include at least some form of computer readable media. Computer readable media can be any available media that can be accessed by server 103 or system 201. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by server 103 or system 201. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

With reference to FIG. 2, an illustrative system for implementing aspects of the invention includes a computing device, such as device 201. In its most basic configuration, device 201 typically includes a processing unit 204 and memory 203. Depending on the exact configuration and type of computing device, memory 203 may be volatile (such as RAM), non-volatile (such as ROM, flash memory, etc.) or some combination of the two. Additionally, device 201 may also have mass storage (removable and/or non-removable) such as magnetic or optical disks or tape 205-206. Similarly, device 201 may also have input devices such 208 (including a mouse, stylus, keyboard, trackball, and the like) and/or output devices 207 such as a display and the like. Other aspects of device 201 may include network connections 209 to other devices, computers, networks, servers, etc. using either wired or wireless media 210. All these devices are well know in the art and need not be discussed at length here.

Overview of Cross Language Migration

One desire of mainstream computing is to have all computing systems be based on a localization independent model. For purposes herein, English will be used as the localization independent language. Of course, French, Spanish, or any other language or non-language (for example, a purely symbolic language) or other combination may be used in place of English. English is used for illustrative purposes only. Also, for purposes herein, local or localized refers to a non localization independent (or language dependent) language of an application or operating system.

Migrating a localized operating system to a localization independent operating system needs at least a few of the strings denoting file paths, registry settings and the like be converted into a localization independent form (here, English) so as to allow an upgrading tool to work in a known state. Cross language migration as described herein makes these conversions and, in some aspects, may further resolve application compatibility issues caused by these conversions.

Figure 3A:
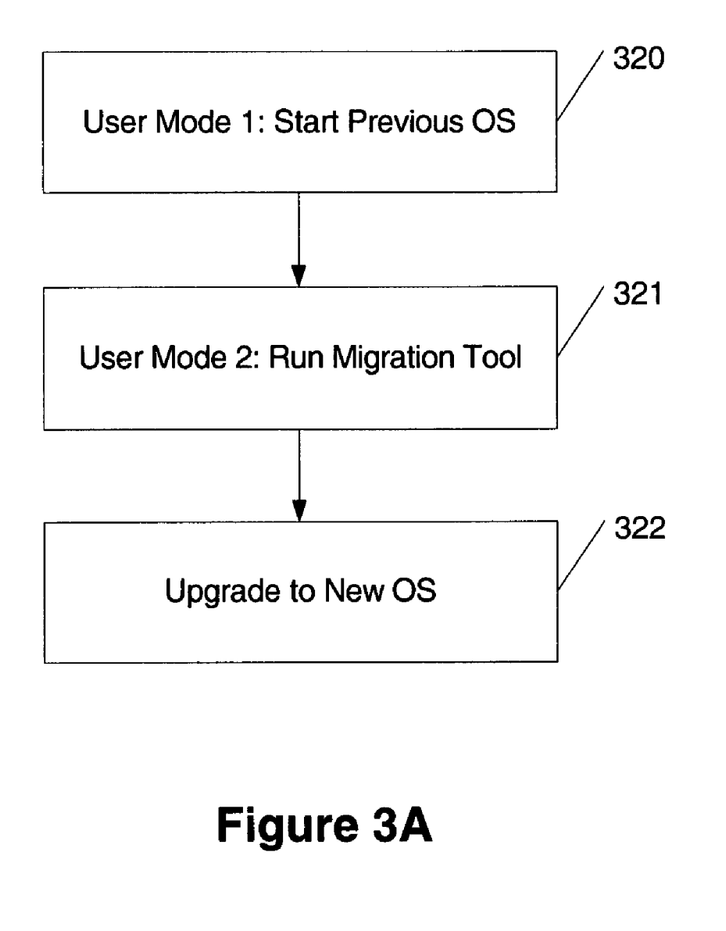
FIGS. 3A and 3B show flow diagrams for performing cross language migration of systems in accordance with aspects of the present invention.

The basic idea for cross language migration is un-localization. The term "unlocalize" is used to describe a process that converts the localized strings to a language independent form. The un-localization process is done before the actual operating system upgrade. This is outlined in FIG. 3A. In one example, a user starts a previous operating system (one that is to be migrated) 320. This is referred to as user mode 1. Next, the user runs the cross language migration process 321. This is referred to as user mode 2. User mode 2 is performed before running the setup program (for instance, provided on a new operating system CD or downloaded from a remote source) to upgrade the machine to the new operating system 322. One benefit of adopting this approach is to isolate all the cross language migration issues to its own processes and allow users to test the machine for correctness before the real operating system upgrade, which is a process that can introduce problems with the operating system itself.

Aspects of the invention may be applied to both operating systems and programs. Further, the migration may be from a first localized language to a second localized language or from a first localized language to a second localization independent language.

Figure 3B:
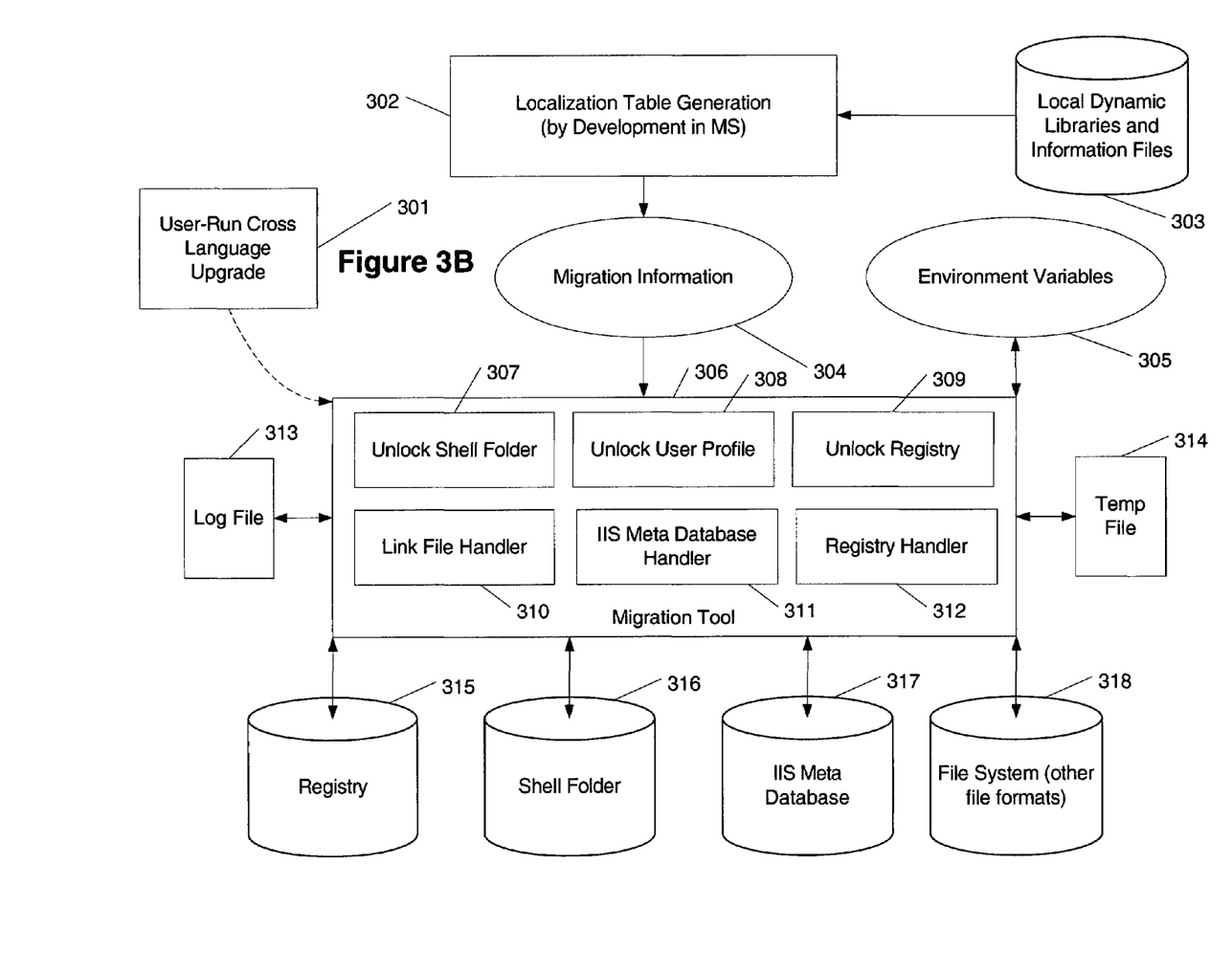

The software architecture for cross language migration is outlined in FIG. 3B. FIG. 3B includes a user-run migration program 301 (for example, a system run by a user including a keyboard and/or pointing device) for initiating the cross language migration. The user-run the cross language migration program 301 may also include an input for providing various supporting software to assist the migration.

The system also includes a localization table generation 302. Here, localization information is determined and added to a data set that may be used by the migration process. The information used by the localization table generation 302 includes local dynamic libraries and information files 303. The localization table generation 302 may a standard alone tool that runs as an executable file or may be combined with the migration tool 306.

The information from the localization table generation 302 is stored as migration information 304. Migration information 304 may be stored as an information file detailing the structure of the system to be migrated and various additional information needed for migration. The migration information 304 may be combined with environment variables 305 and forwarded to a migration tool 306.

The migration tool 306 is a functional representation of a group of processes. The migration tool 306 includes a variety of processes. These processes perform a number of functions including at least some of the following:

Unlock shell folder 307: The shell folder that contains the user interface settings is unlocked to permit modification;

Unlock user profile 308: The user profile that contains various profile information for one or more users (user, guest, admin and the like) is unlocked to permit modification;

Unlock registry 309: The registry is unlocked to permit modification.

Link file handler 310: Links to files are stored and updated where possible. The links are stored to provide a path backward to reestablish the links using the pre-migration information when the post-migration does not work properly.

IIS Meta database handler 311: The migration tool includes a handler that migrates the IIS meta database to a localization independent version. This is an example for specific file handlers. There might be more specific handlers like this. The example is added to show that the invention is generic, adaptable, modular, and expandable.

Registry handler 312: The registry is modified to synchronize the post-migration system structure.

In this example, three handles for different data types are shown. It is appreciated that more handles may be used to deal with different data stores from either system programs or third party programs.

The migration tool 306 exchanges information with a variety of information stores including a log file 313, a temp file 314, the registry 315, the shell folder 316, the IIS Meta database 317, and the rest of the file system 318 (which may include other file formats).

Figure 4:
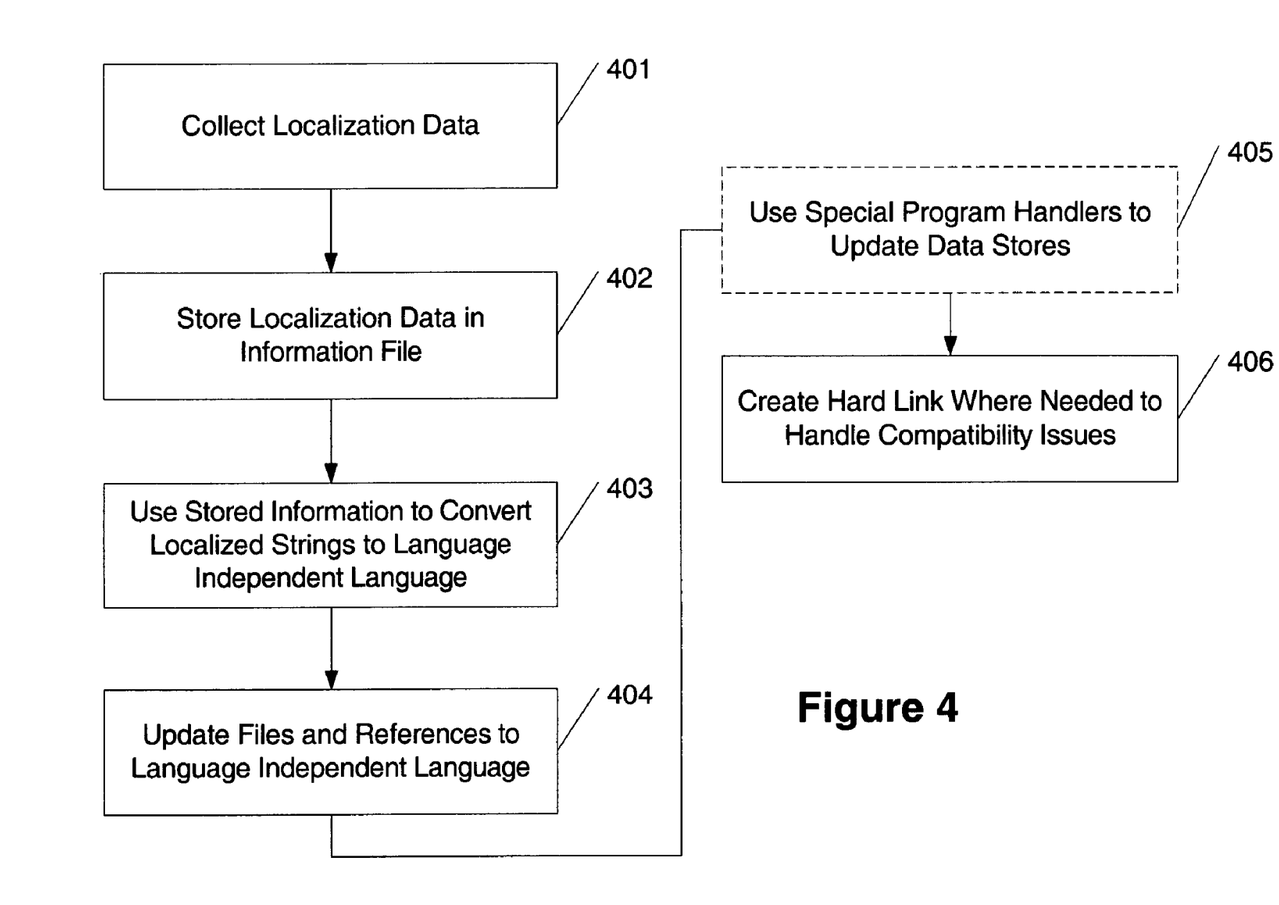
FIGS. 4 and 5 show processes for migrating systems in accordance with aspects of the present invention.

FIG. 4 shows various aspects to the cross language migration system. In the first example, the cross language migration program may be run prior to receiving system upgrades. By running the migration program prior to receiving upgrades, the upgrading process is simplified by isolating the migration process from the upgrading process. This may help preserve the integrity of information prior to upgrading. It also permits the user to determine where an issue arose and fix the issue prior to performing additional steps (for instance, stopping the upgrade process until the migration results can be verified) including additional debugging and testing procedures.

FIG. 4 shows various aspects of the cross language migration program. It is appreciated that the steps shown in FIG. 4 may occur in any order. They are shown here in a particular order as one illustrative example. In step 401, the cross language migration program collects all localized data from local systems automatically. This step reduces the amount of user interaction and increases accuracy.

In step 402, the localization data is stored as migration information 304 from FIG. 3B. Here, one file may be created per language. Alternatively, one file may be created for one or more languages.

In step 403, the localization data is used to convert localized strings to the localization independent language (for example, English). The strings that may be converted include strings in the registry, file names and directory names in the file system. The file names may further include link files from the start menu, desktop icons, or folder names in the start menu. Furthermore, the file names can reside in various folders including a system's programs files folder (for instance, the "Program Files" folder found in Windows® operating systems) or a user's profile folder (for instance, "\Documents and Settings\<username>" found in Windows® operating systems).

In step 404, the cross language migration program may update files and their references to a localization independent language (for instance, with registry and application data).

It is noted that the system conversion and updating process may be separated into multiple layers so that different layers, components, or modules may be used for different types of localized data (for instance, registry entries as opposed to shell folder objects). This module-type approach is shown in step 405.

In step 406, the cross language migration program may use hard links when applications do not function as expected in a migrated system. Hard links permit applications to reference folders and files prior to migration.

Localized Information Generation

Localized information is generated in the localization table generation 302. This process generates a string table for the un-localization of a localized system. The localization table generation 302 includes a template file to store string locations in a released product with a string ID. When running the localization table generation process 302, it loads the template file and reads the localized string information from a data source (for instance, a source CD in the localization language). The output of the process 302 is a string section in the migration information set 304.

Strings are processed as described above. Also, each migration function may have a corresponding section in migration information 304. Each information set for a migration function may include its string location in the installed system, the string type, and subtype. At the end of the migration information 304, string tables may exist for each language. A string table may be automatically generated by a localization generation tool. The localization generation tool helps generates all strings section for all languages. All string tables can then be merged into the migration information 304.

An illustrative example of the migration information 304 may appear as follows:

```
;The following section lists all folder needs to rename.
;The one ends with "PerUser" are per user related settings while ends
;with "PerSystem" are system wide settings
;The format of the items in this section is:
;
;[ShellFolder.Folder.ObjectRename.PerUser]
;<object type>,<old folder name>,<new folder name>, [excluse file list]
;
;where:
;
;<object type> is a number: 0 indicates folder rename
;1 indicates file rename
;2 indicates SFPfile rename
;Following constant defined in clmt.h
;                           #define TYPE_DIR_MOVE 0
;                           #define TYPE_FILE_MOVE 1
;                           #define TYPE_SFPFILE_MOVE 2
;
;<old folder name>
;<new folder name>          if="", it means a delete
;[excluse file list] a list of files/folders relative to <old folder name> that
;need to be excluded when move older folder's to new folder
;
;
;1. If the same level English folder exists, move subfolders and files to
English folder.
;2. If the same level English folder does not exist, create the English folder
and move subfolders/files.
;
;[Generic.Folder.ObjectRename.PerUser]
;0, "%USERPROFILE%\%SRC_Favorites%\%SRC_Links%",
;"%USERPROFILE%\%DST_Favorites%\%DST_Links%"
. . .
;The following sections list item each "shell" folder needs to be changed
;the section is ShellFolder.SHELL_ID, which SHELL_ID will be
CSIDL_PF_ACCESSORIES,CSIDL_PROGRAM_FILES_COMMON,
etc..
;
;in each section
;Registry line defines the regsitry change, its format is
;– Value data reset
;0, [Sub Key], [Reg Type], [Value Name], [Old Value Data], [New Value
Data]
;– Value name reset
```

Notably, the migration information lists the relationship between the old folder names and the new folder names. This permits the migration tool 306 to know which folders to rename and which to skip. Similarly, registry values may be modified as well using this technique of associating a sub key value, the registry type, the value name, the old value data and the new value data.

Localized System Migration

Once migration information 304 has been established, the cross language migration program 306 may be used to start migrating a localized system to a localization independent system.

Figure 5:
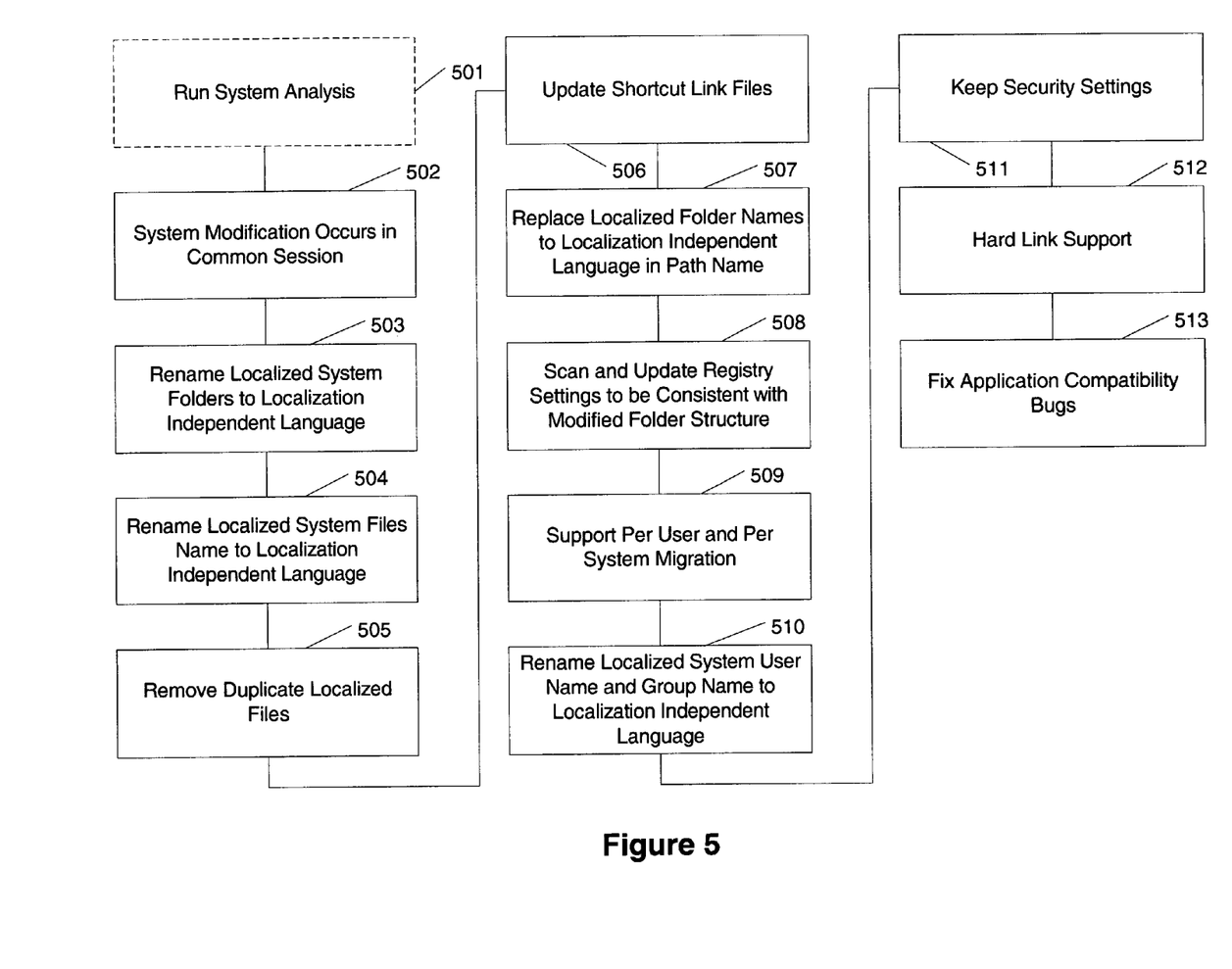

FIG. 5 shows a variety of processes that may be used in the migration tool 306. Prior to the migration tool 306 being run, the system should be analyzed as described above to compile the migration information 304 as shown in broken box 501.

First, in step 502, all system modification occurs in a common section. This permits all modification to occur in a single process, thereby minimizing the chances of an application attempting to use the partially migrated system.

As shown in step 503, the program renames localized system folder names to folder names of a localization independent language.

In step 504, the program renames the localized system file names to a localization independent language.

In step 505, the program removes duplicate localized files.

In step 506, the shortcut link files are updated and, in step 507, the localized folder names are replaced with the localization independent language path names.

In step 508, the program scans and updates registry settings to be synchronized with the modified folder structure.

In step 509, the program processes and supports per user and per system migration.

In step 510, the localized system user names (administrator, guest, . . . ) and group names (administrator group) are renamed to a localization independent language.

In step 511, the security settings are maintained for each component. If during the rename and system update access is denied, the system may take ownership and restore the settings after system migration, thereby reestablishing the security settings.

In step 512, the program creates hard links that permit an application to use the preexisting localized path names after the migration to the localization independent language.

Finally, in step 513, the program attempts to address compatibility issues (not fixable by the hard link support of step 512). This may include prompting a user to reinstall various programs.

Referring to steps 501 and 502, the migration process has two parts. The first part is system analysis (step 501). It scans the system and generates the migration information file 304 for the actions to be taken. One benefit to having the analysis step 501 separate from the migration step 502 is that the analysis step 501 can be stopped any time and causes no impact to the system.

One may also run the migration tool 306 then run a set up program (for instance, Windows Setup (winnt32)). During Windows® setup, it will run system compatibility analysis. If this fails, it won't upgrade the system. At that time, the system will be inconsistent. To avoid this from happening, the migration tool may run the setup procedure at the beginning of step 501 to make sure the system does not have any compatibility issues before modifying the system. The user will be asked to continue or stop the migration process after determining the results from the setup procedure.

Referring to step 512, it is appreciated that not all application data will be able to be migrated without some type of compatibility issue (for instance, if an application is still looking for a specific folder path that is localized, the request will fail after cross language migration has been run). To accommodate these issues, hard link support for each localized folder may be used. This is discussed in greater detail with respect to FIG. 8.

Figure 6:
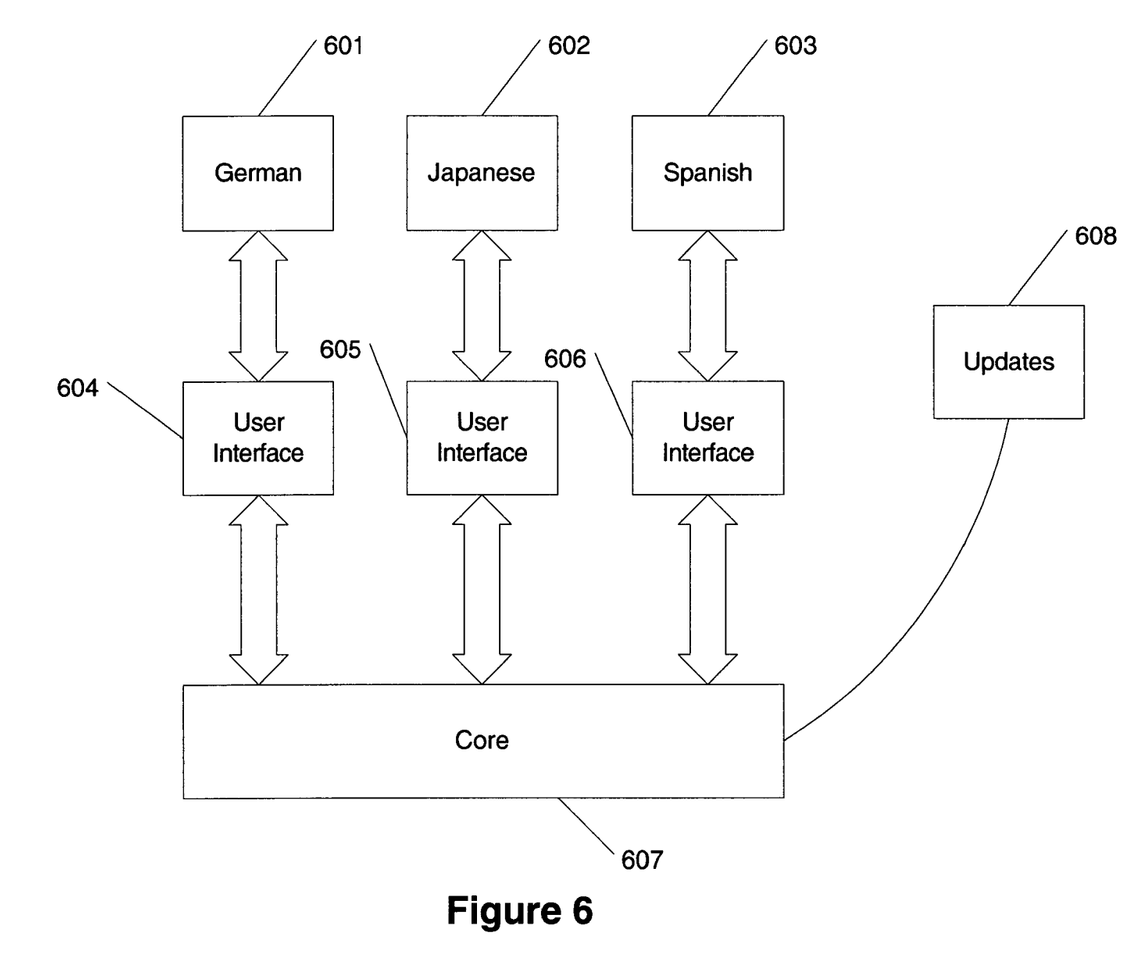
FIG. 6 shows updates applied to migrated platforms in accordance with aspects of the present invention.

FIG. 6 shows an example of a system having been migrated to a localization independent language and the operating system upgraded. Here, three different languages German 601, Japanese 602, and Spanish 603 each interact with their own user interface (604-606, respectively). All interact with core functionality 607 which is in the localization independent language. Here, updates may be directly applied to the core 607 without disturbing the specific localizations of the system (into German, Japanese and Spanish, respectively). It is appreciated that any language may be the specific localization of the system. These languages are used for illustrative purposes only.

Figure 7:
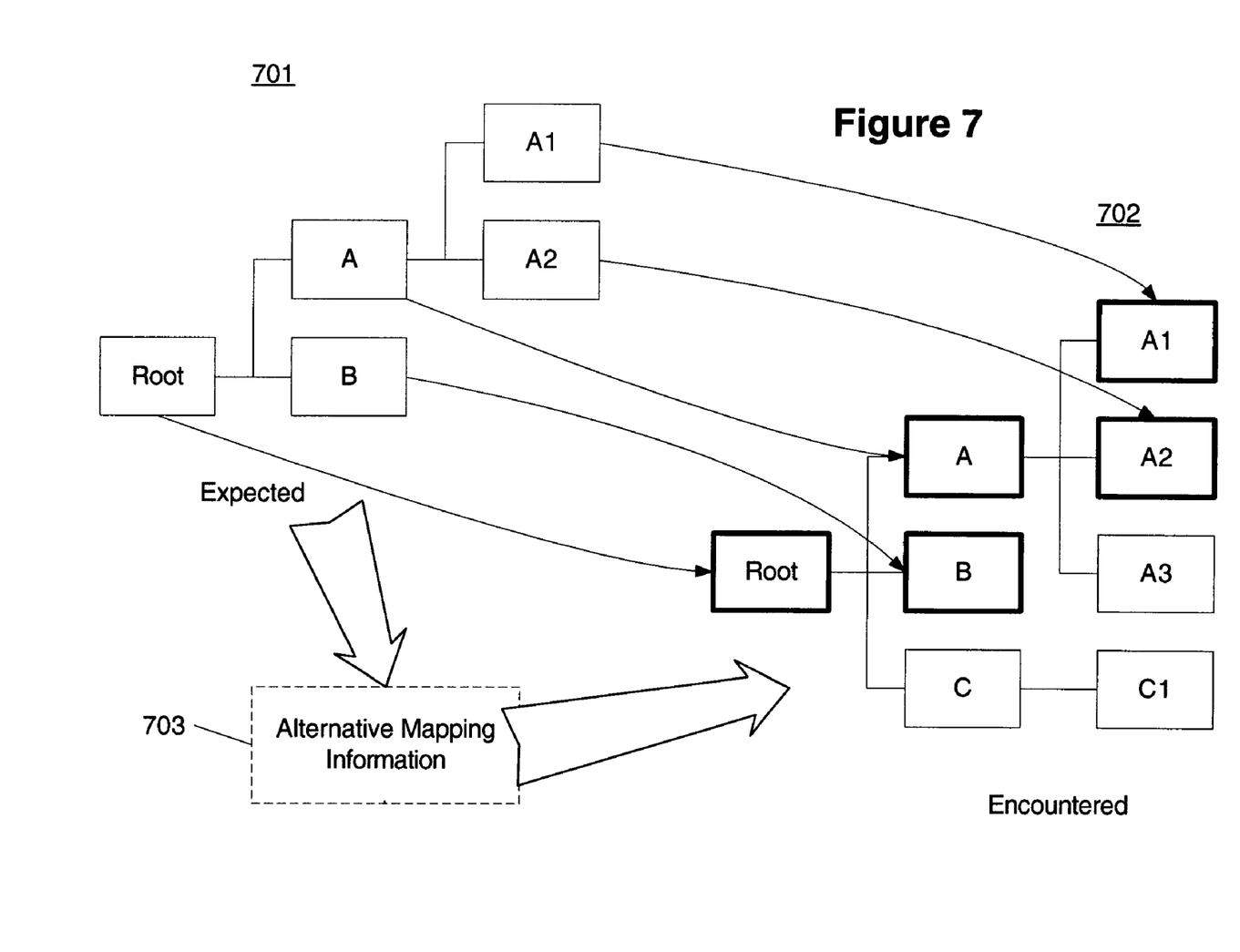
FIG. 7 shows a mapping of an expected file structure to that of an encountered file structure in accordance with aspects of the present invention.

FIG. 7 shows how the system may organize information into the migration information 304. Here, file structure 701 is expected to be found. File structure 701 includes a root directory and folders A (with sub folders A1 and A2) and B with no subfolders. Upon examining a system to be migrated, the migration system determines file structure 702 to which the root directory, folders A, B, A1 and A2 match. Additional folders A3, C and C1 also exist. As these additional folders were not expected, they are ignored. Thus, migration information 304 may include a mapping from the expected folders in 701 to 702. Alternatively, a user may have modified the installation directories of the system to alter the encountered file structure from the expected file structure. In this situation, alternative mapping information 703 may be stored and provided to help create migration information 304.

Figure 8:
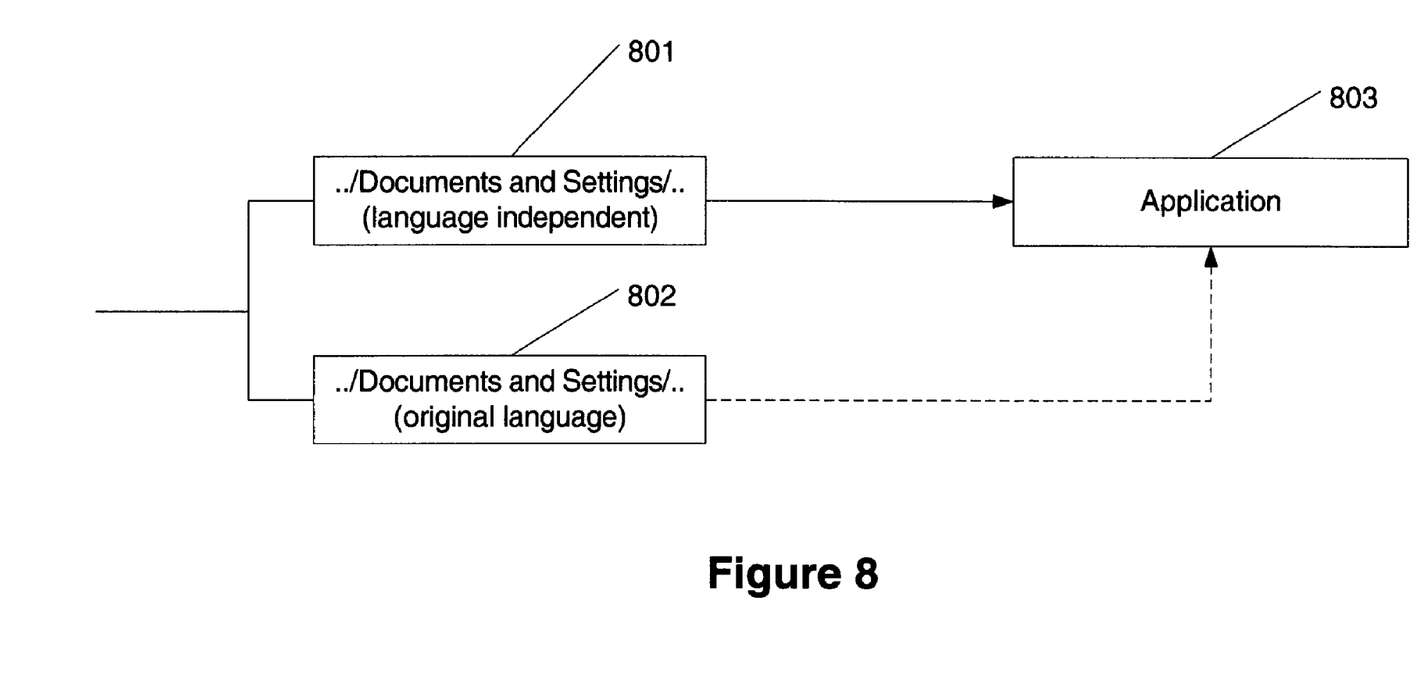
FIG. 8 shows an example of hard link support for aspects of the present invention.

FIG. 8 shows a system for providing hard links in a file system. After migration, a folder 801 may exist with a language independent name that may be used by application 803. However, because of an issue with compatibility, a hard link 802 may be used as a secondary folder with its original localization information intact to permit an application 803 to continue to use it if compatibility issues arise. The content of the hard link may be the same as the content (or may point to the content) of folder 801.

The following are various options that may be used to streamline the cross language migration process.

For folder modifications:

One may use a shell folder object to implement each function defined in the migration information 304.

If the same level localization independent folder does not exist, rename the localized folder to localization independent folder.

If the same level localization independent folder exists, then rename existing localization independent folder to identify it as pre-existing and duplicate.

For file modifications:

If the same level localization independent file exists, then rename existing localization independent file to identify it as pre-existing and duplicate.

If the same level localization independent file does not exist, rename the localized file name to the localization independent language.

For modifications to the registry:

Scan the whole registry (per system and per user) and query localized folder names for values. Replace the localized folder name paths to localization independent language folder name paths.

For folder name string conflicts (e.g., "Program Files" and "Programs" folders are localized to "Program" in Swedish), one may use the full path with a shell folder ID to distinguish the two folders.

For shortcut files:

A shortcut link file may be addressed by file enumeration. The file path to be covered may be specified in the information file.

For application data:

Attempt to update application data. For example, application data that is in text format such as INI, INF, CMD files, one may attempt to debug the applications as to why they do not function with the new migration.

Attempt to fix all application binary data. For example, one may attempt to address any conflicts in Microsoft Corporation's IIS metabase.

If an application continues to fail, in one optional aspect, one may undo the localization independent changes to attempt to make an application work after a migration and operating system upgrade. For example, if an application has a localized Program Files folder name in its binary application data, one may undo the modification to the Program Files folder to fix this issue. This approach may also be used when working with shell folder upgrades.

To execute an undo function, one may run an undo tool that projects a dialog box that displays some or all issues with the migration. One can then select an issue or application with an issue then have the tool execute an undo procedure to replace a localization independent file or folder with its location dependent version.

For batch files:

Batch files and HTML text files may be addressed individually as well. Additional limitations to which files may be modified may be added to eliminate incorrect conversions.

For system settings:

Both the installed language and the default language settings may be changed to the localization independent language. Here, for example, the languages may be set to US English. From this point a user may upgrade the system the same as if the system was set to the localization independent language (for example, English).

Aspects of the present invention have been described in terms of illustrative embodiments thereof. Numerous other embodiments, modifications and variations within the scope and spirit of the appended claims will occur to persons of ordinary skill in the art from a review of this disclosure.

We claim:

1. A process for changing a computer system or application from a first language to at least a second language comprising the steps of:
   determining a structure of a system about to be migrated;
   storing migration information based on the determination of the structure; performing said migration based on said stored migration information, wherein performing said migration modifies at least some core code of the computer system from a language dependent form into a language independent form;
   performing said migration based on a module-type migration and based on said stored information to a stored link to provide a path backwards to reestablish the stored link using pre-migration information including:
      a user-related setting string;
      at least one system-wide setting string, with each user-related or system wide setting string allowing a registry value association between said stored migration information and a stored registry in an automatically generated string table;
      wherein said migration information can compare a file name with said stored registry, to said automatically generated string table; and
   performing said migration based on said stored migration information to a stored registry to synchronize the post-migration system structure.

2. The process according to claim 1, further comprising the step of establishing at least one localized language hard link to supplement for at least one location independent folder for use with an application.

3. The process according to claim 1, wherein said migration information is drawn from local dynamic libraries and information files.

4. The process according to claim 1, wherein said migration information is used with environment variables for said performing steps.

5. The process according to claim 1, wherein said performing step further comprises the step of:
   unlocking shell folders.

6. The process according to claim 1, wherein said performing step further comprises the step of:
   unlocking system of at least one user and group profiles.

7. The process according to claim 1, wherein said performing step further comprises the step of:
   unlocking a registry.

8. The process according to claim 1, wherein said performing step further comprises the step of:
   replacing localized links with unlocalized links.

9. The process according to claim 1, wherein said performing step further comprises the step of:
   replacing localized information in an IIS meta database with unlocalized information.

10. The process according to claim 1, wherein said migration information includes a list of localized strings and corresponding unlocalized versions to which the strings are to be converted.

11. A system for modifying a computer system or computer application from a first language to at least a second language comprising:
   means for determining a structure of a system about to be migrated;
   means for storing migration information based on the determination of the structure;
   means for performing said migration based on said stored migration information, wherein performing said migration modifies at least some core code of the computer system from a language dependent form into a language independent form;
   means for performing said migration based on a module-type migration and based on said stored information to a stored link to provide a path backwards to reestablish the stored link using pre-migration information including:
      means for setting a user-related string;
      means for setting at least one system-wide string, with each user-related or system wide setting string allowing a registry value association between said stored migration information and a stored registry in an automatically generated string table;
      wherein said migration information can compare a file name with said stored registry, to said automatically generated string table; and
   means for performing said migration based on said stored migration information to a stored registry to synchronize the post-migration system structure.

12. The system according to claim 11, further comprising:
   means for enabling a hard link to substitute for a location independent folder for use with an application.

13. The system according to claim 11, wherein said migration information is drawn from local dynamic libraries and information files.

14. The system according to claim 11, wherein said migration information is used with environment variables in said performing means.

15. The system according to claim 11, wherein said means for performing further comprises:
   means for unlocking shell folders.

16. The system according to claim 11, wherein said means for performing further comprises:
   means for unlocking user profiles.

17. The system according to claim 11, wherein said means for performing further comprises;
   means for unlocking a registry.

18. The system according to claim 11, wherein said means for performing further comprises:
   means for replacing localized links with unlocalized links.

19. The system according to claim 11, wherein said means for performing further comprises:
   means for replacing localized information in an IIS meta database with unlocalized information.

20. The system according to claim 11, wherein said migration information includes a list of localized strings and unlocalized versions to which the strings are to be converted.

21. The system according to claim 11, wherein said migration is performed on an installed operating system before upgrading the operating system.

22. The system according to claim 11, wherein, once said system has been migrated, said system may accommodate additional languages.

23. A computer storage medium having a program stored thereon, said program for changing a computer system or computer application from a first language to at least a second language, said program comprising the steps of:
   determining a structure of a system about to be migrated;
   storing migration information based on the determination of the structure;
   performing said migration based on said stored migration information, wherein said migration modifies at least some core code of the computer system from a language dependent form into a language independent form;
   performing said migration based on a module-type migration and based on said stored information to a stored link to provide a path backwards to reestablish the stored link using pre-migration information including:
      a user-related setting string;
      at least one system-wide setting string, with each user-related or system wide setting string allowing a registry value association between said stored migration information and a stored registry in an automatically generated string table;
      wherein said migration information can compare a file name with said stored registry, to said automatically generated string table; and
   performing said migration based on said stored migration information to a stored registry to synchronize the post-migration system structure.

24. The computer storage medium according to claim 23, further comprising the step of establishing at least one localized language hard link to supplement for at least one location independent folder for use with an application.

25. The computer storage medium according to claim 23, wherein said migration information is drawn from local dynamic libraries and information files.

26. The computer storage medium according to claim 23, wherein said migration information is used with environment variables for said performing steps.

27. The computer storage medium according to claim 23, wherein said performing step further comprises the step of:
   unlocking shell folders.

28. The computer storage medium according to claim 23, wherein said performing step further comprises the step of:
   unlocking system of at least one user and group profiles.

29. The computer storage medium according to claim 23, wherein said performing step further comprises the step of:
   unlocking a registry.

30. The computer storage medium according to claim 23, wherein said performing step further comprises the step of:
   replacing localized links with unlocalized links.

31. The computer storage medium according to claim 23, wherein said performing step further comprises the step of:
   replacing localized information in an IIS meta database with unlocalized information.

32. The computer storage medium according to claim 23, wherein said migration information includes a list of localized strings and corresponding unlocalized versions to which the strings are to be converted.

33. The process according to claim 1, wherein the first language is a first localized language and the second language is a localization independent language.

34. The process according to claim 1, wherein the first language is a first localized language and the second language is a second localized language.

35. The system according to claim 11, wherein the first language is a first localized language and the second language is a localization independent language.

36. The system according to claim 11, wherein the first language is a first localized language and the second language is a second localized language.

37. The computer storage medium according to claim 23, wherein the first language is a first localized language and the second language is a localization independent language.

38. The computer storage medium according to claim 23, wherein the first language is a first localized language and the second language is a second localized language.

* * * * *